United States Patent
Drexler

(10) Patent No.: US 10,815,015 B2
(45) Date of Patent: Oct. 27, 2020

(54) ASTEROID REDIRECTION AND SOFT LANDING FACILITATED BY COSMIC RAY AND MUON-CATALYZED FUSION

(71) Applicant: Jerome Drexler, Los Altos Hills, CA (US)

(72) Inventor: Jerome Drexler, Los Altos Hills, CA (US)

(*) Notice: Subject to any disclaimer, the term of this patent is extended or adjusted under 35 U.S.C. 154(b) by 476 days.

(21) Appl. No.: 15/832,480

(22) Filed: Dec. 5, 2017

(65) Prior Publication Data

US 2019/0168896 A1 Jun. 6, 2019

(51) Int. Cl.
| | | |
|---|---|---|
| *B64G 1/40* | (2006.01) | |
| *F42B 12/50* | (2006.01) | |
| *F42B 5/02* | (2006.01) | |
| *F42C 9/00* | (2006.01) | |
| *F42B 12/20* | (2006.01) | |

(Continued)

(52) U.S. Cl.
CPC ........... *B64G 1/408* (2013.01); *F42B 5/02* (2013.01); *F42B 12/207* (2013.01); *F42B 12/50* (2013.01); *F42C 9/00* (2013.01); *F42C 13/00* (2013.01); *G21B 1/19* (2013.01); *G21H 7/00* (2013.01); *G21J 3/00* (2013.01)

(58) Field of Classification Search
CPC .......... B64G 1/40; B64G 1/405; B64G 1/408; B64G 2700/00; G21J 3/00; G21H 7/00
See application file for complete search history.

(56) References Cited

U.S. PATENT DOCUMENTS

| | | | |
|---|---|---|---|
| 4,036,012 A * | 7/1977 | Monsler ............. | F03H 1/00 60/203.1 |
| 2006/0126771 A1* | 6/2006 | Da Conceicao ......... | G21G 1/04 376/100 |

(Continued)

FOREIGN PATENT DOCUMENTS

| | | |
|---|---|---|
| CA | 2153406 A1 | 7/1994 |
| JP | H08211190 A | 8/1996 |

(Continued)

OTHER PUBLICATIONS

Aguilar et al., "Precision Measurement of the Proton Flux in Primary Cosmic Rays from Rigidity 1 GV to 1.8 TV with the Alpha Magnetic Spectrometer on the International Space Station", Physical Review Letters, PRL 114, 171103, May 1, 2015, 9 pages.

(Continued)

*Primary Examiner* — J. Woodrow Eldred
(74) *Attorney, Agent, or Firm* — Thomas Schneck; Mark Protsik

(57) ABSTRACT

Asteroid redirection and soft-landing systems are provided that use cosmic ray and muon-catalyzed micro-fusion. These systems include a micro-fusion propulsion system providing thrust for redirecting a small asteroid, as well as providing a particle cushion at a landing site for a soft-landing. The systems deploy deuterium-containing fuel material as a localized cloud interacting with incoming ambient cosmic rays to generate energetic fusion products. Dust or other particulate matter in the fuel material converts some cosmic rays into muons that also catalyze fusion. The fusion products provide thrusting upon the asteroid. The fusion products also aid deceleration of incoming asteroids to be mined for a soft landing upon a lunar or planetary surface.

20 Claims, 3 Drawing Sheets

(51) Int. Cl.
G21H 7/00 (2006.01)
G21J 3/00 (2006.01)
F42C 13/00 (2006.01)
G21B 1/19 (2006.01)

(56) References Cited

U.S. PATENT DOCUMENTS

| | | | |
|---|---|---|---|
| 2008/0123793 | A1 | 5/2008 | Loan et al. |
| 2009/0000268 | A1* | 1/2009 | Yurash ................ G21B 1/01 |
| | | | 60/202 |
| 2013/0005200 | A1* | 1/2013 | Mayburd ............. G21D 7/00 |
| | | | 440/18 |
| 2015/0052886 | A1* | 2/2015 | Adams ................ G21C 1/32 |
| | | | 60/512 |
| 2015/0098543 | A1* | 4/2015 | Cohen ............... G21B 1/052 |
| | | | 376/131 |
| 2018/0033496 | A1* | 2/2018 | Sedwick ............. B64G 1/405 |

FOREIGN PATENT DOCUMENTS

| | | |
|---|---|---|
| WO | WO9013125 A1 | 11/1990 |
| WO | WO9222909 A1 | 12/1992 |
| WO | WO2014114986 A1 | 7/2014 |

OTHER PUBLICATIONS

Alvarez et al., "The Catalysis of Nuclear Reactions by mu Mesons", Lawrence Berkeley National Laboratory, Dec. 10, 1956, 5 pages.
Nakamura et al. (revised by Beatty et al.), "Cosmic Rays", JP G 37, 075021, Feb. 16, 2012, 21 pages.
Hassler et al., "Mars' Surface Radiation Environment Measured with the Mars Science Laboratory's Curiosity Rover", Science, Nov. 12, 2013, 35 pages.
Jackson, "A Personal Adventure in Muon-Catalyzed Fusion", Physics in Perspective 12, 2010, pp. 74-88.
Jackson, "Muon Catalysis of Fusion: A Commentary", Lawrence Berkeley Laboratory, Physics Division, Aug. 1984, 12 pages.
Kaye & Laby, NPL, "Cosmic Rays", 4 pages, http://www.kayelaby.npl.co.uk/general_physics/2_7/2_7_7.html.
Kaye & Laby, NPL, "Nuclear Fusion", 9 pages, http://www.kayelaby.npl.co.uk/atomic_and_nuclear_physics/4_7/4_7_4.html.
Cucinotta et al., "Space Radiation Cancer Risk Projections and Uncertainties—2012", NASA/TP-2013-217375, Jan. 2013, chapter 2—pp. 9-41.
Nuclear Power, "Photoneutrons", Nov. 3, 2015, 3 pages, https://www.nuclear-power.net/nuclear-power/fission/delayed-neutrons/photoneutrons/>.
U.C. Berkeley Physics 250, "Cosmic Rays", Neutrino/Nuclear Astrophysics, Spring 2011, Class Notes, Chapter 9, pp. 1-36, available from Univ. of Washington, www.int.washington.edu/PHYS554/2011/chapter9_11.pdf.
Dinerman, "How to Beat the High Cost of Gravity", Wall Street Journal, Jul. 21, 2017, 1 page.
Griggs, "3 Things to learn from NASA's Asteroid-Visiting Spacecraft, Dawn", www.popularmechanics.com/space/a6802/3-things-to-learn-from-nasa-asteroid-visiting-spacecraft-dawn/, Jul. 18, 2011, 2 pages.
National Aeronautics and Space Administration, "Near-Earth Object Survey and Deflection Analysis of Alternatives", Report to Congress, NASA, Mar. 2007, 27 pages.
Wall, "How Humanity Could Deflect a Giant Killer Asteroid", https://www.space.com/23530-killer-asteroid-deflection-saving-humanity.html, Nov. 22, 2013, 3 pages.
Wikipedia, "Asteroid impace avoidance", https://en.wikipedia.org/w/index.php?title=Asteroid_impace_avoidance&oldid=799903142, Sep. 10, 2017, 23 pages.
Wikipedia, "Asteroid mining", https://en.wikipedia.org/w/index.php?title=Asteroid_mining&oldid=795635106, Aug. 15, 2017, 23 pages.

* cited by examiner

ASTEROID REDIRECTION AND SOFT LANDING FACILITATED BY COSMIC RAY AND MUON-CATALYZED FUSION

TECHNICAL FIELD

The present invention relates to space systems for providing a change of trajectory to small asteroids for moving them to a more convenient location for mining and soft landing the asteroids onto a lunar or planetary surface.

BACKGROUND ART

There are several possible methods being explored for providing a deflection or redirection of small asteroids (less than 100 m diameter) into a new orbit to exploit its mineral resources more conveniently. Many asteroids are rich in valuable elements that are either relatively rare in the Earth's crust or whose terrestrial reserves are becoming increasingly scarce due to overconsumption (e.g., the platinum-group metals, as well as nickel and cobalt). By one estimate, a 100 m diameter M-type asteroid may contain $50 billion worth of platinum. Additionally, many other asteroids comprise raw materials for space-based construction or as a source of extractable water and oxygen useful for sustaining manned deep space operations.

Deflection or redirection techniques being explored generally divide into those that provide a large, but short-lived, impulse to the asteroid (e.g. by explosive or kinetic impact) and others that provide a slow, but sustained, push (whether by ablation of asteroid material with focused solar energy or a pulsed laser, ejecting of mined asteroid material at high velocity, by attachment to the asteroid and giving a direct tug or push, or by a gravity tractor flying in close proximity). Because of the greater velocity change needed for redirecting an asteroid to a more convenient location for mining, the methods being explored would be limited at this time to asteroids smaller than about 20 m in diameter and with a mass not more than $10^7$ kg. Improvements in propulsion systems could eventually allow asteroids smaller than 100 m diameter and $10^9$ kg mass to be successfully redirected.

If one wishes to move even a relatively small asteroid would require that one burn rocket engines longer than usual for most spaceflights to achieve a desired change in velocity, but this consumes significant amounts of fuel and isn't feasible with current rocket technology. Likewise, to provide a constant acceleration from thrust would require that rocket engines burn constantly over the entire flight, leading to even greater fuel usage. Even when using a standard accelerate-coast-decelerate trajectory, an asteroid's heavy mass calls for a significant penalty in fuel if using chemical rocket engines. Current cost estimates for redirecting an asteroid with existing chemical rocket technology begin at several billion dollars.

Sustained investments in fundamental research and early-stage innovation in propulsion technologies is required to meet asteroid mining goals. Such research and development activity is expected to proceed in several general stages, beginning with an Earth-reliant stage with research and testing on the ISS of concepts and systems that could enable deep space, long-duration crewed missions, followed by a proving ground stage in cis-lunar space to test and validate complex operations and components before moving on to largely Earth-independent stages. Such a proving ground stage would field one or more in-space propulsion systems capable of performing the desired task of reaching a selected asteroid in "near-Earth" orbit to undergo a series of shakedown tests to demonstrate their capabilities, select a final architecture, and make needed upgrades revealed by the shakedown tests. While systems already in development for the initial Earth-reliant missions largely make use of existing technologies, investment in the development of newer technologies will be needed to meet the longer-term deep space challenges.

Several projects have explored the possibility of nuclear spacecraft propulsion. The first of these was Project Orion from 1958-1963 built upon general proposals in the 1940s by Stanislaw Ulam and others, in which external atomic detonations would form the basis for a nuclear pulse drive. Later, between 1973 and 1978, Project Daedalus of the British Interplanetary Society considered a design using inertial confinement fusion triggered by electron beams directed against fuel pellets in a reaction chamber. From 1987 to 1988, Project Longshot by NASA in collaboration with the US Naval Academy developed a fusion engine concept also using inertial confinement fuel pellets but this time ignited using a number of lasers. Naturally, these last two projects depend upon successfully achieving nuclear fusion.

Muon-catalyzed fusion was observed by chance in late 1956 by Luis Alvarez and colleagues during evaluation of liquid-hydrogen bubble chamber images as part of accelerator-based particle decay studies. These were rare proton-deuteron fusion events that only occurred because of the natural presence of a tiny amount of deuterium (one part per 6000) in the liquid hydrogen. It was quickly recognized that fusion many orders of magnitude larger would occur with either pure deuterium or a deuterium-tritium mixture. However, John D. Jackson (Lawrence Berkeley Laboratory and Prof. Emeritus of Physics, Univ. of California, Berkeley) correctly noted that for useful power production there would need to be an energetically cheap way of producing muons. The energy expense of generating muons artificially in particle accelerators combined with their short lifetimes has limited its viability as an Earth-based fusion source, since it falls short of break-even potential.

Another controlled fusion technique is particle-target fusion which comes from accelerating a particle to sufficient energy so as to overcome the Coulomb barrier and interact with target nuclei. To date, proposals in this area depend upon using some kind of particle accelerator. Although some fusion events can be observed with as little as 10 KeV acceleration, fusion cross-sections are sufficiently low that accelerator-based particle-target fusion are inefficient and fall short of break-even potential.

It is known that cosmic rays are abundant in interplanetary space. Cosmic rays are mainly high-energy protons (with some high-energy helium nuclei as well) with kinetic energies in excess of 300 MeV. Most cosmic rays have GeV energy levels, although some extremely energetic ones can exceed $10^{18}$ eV. FIG. 4 shows cosmic ray flux distribution at the Earth's surface. In near-Earth space, the alpha magnetic spectrometer (AMS-02) instrument aboard the International Space Station since 2011 has recorded an average of 45 million fast cosmic ray particles daily (approx. 500 per second). The overall flux of galactic cosmic ray protons (above earth's atmosphere) can range from a minimum of 1200 $m^{-2}s^{-1}$ $sr^{-1}$ to as much as twice that amount. (The flux of galactic cosmic rays entering our solar system, while generally steady, has been observed to vary by a factor of about 2 over an 11-year cycle according to the magnetic strength of the heliosphere.) Outside of Earth's protective magnetic field (e.g. in interplanetary space), the cosmic ray flux is expected to be several orders of magnitude greater. As measured by the Martian Radiation Experiment (MARIE) aboard the Mars Odyssey spacecraft, average in-orbit cosmic ray doses were about 400-500 mSv per year, which is an order of magnitude higher than on Earth.

Cosmic rays are known to generate abundant muons from the decay of cosmic rays passing through Earth's atmosphere. Cosmic rays lose energy upon collisions with atmospheric dust, and to a lesser extent atoms or molecules, generating elementary particles, including pions and then muons, usually within a penetration distance of a few cm. Typically, hundreds of muons are generated per cosmic ray particle from successive collisions. Near sea level on Earth, the flux of muons generated by the cosmic rays' interaction by the atmosphere averages about 70 $m^{-2}s^{-1}sr^{-1}$. The muon flux is even higher in the upper atmosphere. These relatively low flux levels on Earth reflect the fact that both Earth's atmosphere and geomagnetic field substantially shields our planet from cosmic ray radiation. Mars is a different story, having very little atmosphere (only 0.6% of Earth's pressure) and no magnetic field, so that muon generation at Mars' surface is expected to be very much higher than on Earth's surface. Planetary moons, such as Phobos and Deimos around Mars, would experience similar high levels of cosmic ray flux.

SUMMARY DISCLOSURE

The present invention is a method and system of propulsion that takes advantage of the abundance of cosmic rays available for free in interplanetary space and the abundance of muons generated on Mars or other planets (or their moons) with a thin (or no) atmosphere and weak (or no) magnetic field to catalyze sufficient fusion events to produce useful thrust. Here the thrust is available for accelerating asteroids along a specified trajectory, and then allowing very small asteroids (less than about 4 meters diameter and 100 metric tons mass) to soft land on a lunar or planetary surface. Note that the cosmic rays and muons are available here for free and do not need to be generated artificially in an accelerator. Since the amount of energy needed for thrust is generally much less than the multi-kiloton yields of atomic weapons, "micro-fusion" is the term used here to refer to fusion energy outputs of not more than 10 gigajoules per second (2.5 tons of TNT equivalent per second), to thereby exclude macro-fusion type explosions.

One would install a group of micro-fusion rocket engines on an asteroid and coordinate their operation to control the asteroid's change in trajectory. One way to achieve thrust is to project successive packages of micro-fusion fuel targets (pellets, chips or powder) in a specified direction outward from the asteroid or spacecraft using one or more "guns". The micro-fusion target material will then interact with the ambient flux of cosmic rays and muons producing a combination of particle-target micro-fusion and/or muon-catalyzed micro-fusion, generating kinetic-energy-containing fusion products that produce an accelerating or decelerating thrust against vehicle. An external pusher configuration similar to that proposed for any of Projects Orion, Daedalus or Longshot could be used to receive the thrust, except that here it is billions of controlled micro-fusion events, not atomic explosions, that are the source of that thrust. A similar approach can be adapted to create a cushion of energetic fusion products producing enough thrust to allow soft landing.

The deuterium "fuel" for the particle-target and/or muon-catalyzed micro-fusion may be supplied in the form of solid $Li^6D$ as chips, pellets or powder, or even heavy water ($D_2O$) or liquid deuterium ($D_2$). To assist muon formation, the fuel packages may contain up to 20% by weight of added particles of fine sand or dust. Muon-created muonic deuterium can come much closer to the nucleus of a similar neighboring atom with a probability of fusing deuterium nuclei, releasing energy. Once a muonic molecule is formed, fusion prodeeds extremely rapidly (~$10^{-10}$ sec). One cosmic ray particle can generate hundreds of muons, and each muon can typically catalyze about 100 micro-fusion reactions before it decays (the exact number depending on the muon "sticking" cross-section to any helium fusion products).

Other types of micro-fusion reactions besides D-D are also possible depending upon the target material. For example, another reaction is $Li^6+D\rightarrow 2He^4+22.4$ MeV, where much of the useful excess energy is carried as kinetic energy of the two helium nuclei (alpha particles). Additionally, any remaining cosmic rays can themselves directly stimulate micro-fusion events by particle-target fusion, wherein the high energy cosmic ray particles (mostly protons, but also helium nuclei) bombard relatively stationary target material. When bombarded directly with cosmic rays, the lithium-6 may be transmuted into tritium which could form the basis for some D-T micro-fusion reactions. Although D-D micro-fusion reactions occur at a rate only 1% of D-T micro-fusion, and produce only 20% of the energy by comparison, the freely available flux of cosmic rays and their generated muons should be sufficient to yield sufficient micro-fusion energy output for practical use.

The present invention achieves nuclear micro-fusion using deuterium-containing target material, and the ambient flux of cosmic rays and generated muons that are already naturally present. The optimum concentration of the target material for the particle-target and muon-catalyzed fusion may be determined experimentally based on the particular abundance of cosmic rays with a view to maintaining billions of micro-fusion reactions for producing adequate thrust for the specified application, while avoiding any possibility of a runaway macro-fusion event.

At a minimum, since both particle-target micro-fusion and muon-catalyzed micro-fusion, while recognized, are still experimentally immature technologies (since measurements have only been conducted to date on Earth using artificially accelerated particles and generated muons from particle accelerators), various embodiments of the present invention can have research utility to demonstrate feasibility in environments beyond Earth's protective atmosphere and/or geomagnetic field, initially above Earth's atmosphere (e.g. on satellite platforms) for trial purposes, and then on the Moon or in lunar orbit before further testing at a near-Earth orbit (NEO) asteroid, to determine optimum parameters for various utilities in those environments. For example, the actual number of micro-fusion reactions for various types of fusion fuel sources and target configurations, and the amount of thrust that can be derived from such reactions, are still unknown and need to be fully quantified in order to improve the technology. The fusion-enhanced propulsion system requires strong cosmic ray flux to create sufficient nuclear micro-fusion for thrust purposes, and therefore is best suited to operation in deep space environments, such as in proximity to asteroids or for interplanetary travel.

DETAILED DESCRIPTION

Cosmic-ray and muon-catalyzed micro-fusion can be employed in the invention in one of several ways. One is to shorten travel time to an asteroid in near-Earth orbit, the asteroid belt between Mars and Jupiter and elsewhere in our solar system. Upon arrival, mining of the asteroid can proceed (either by automated mining equipment transported to the asteroid, or with assistance of astronaut-miners) and the mined products returned to Earth. Alternatively, the asteroid can be redirected to a location closer to Earth, such as in lunar orbit, or (if the asteroid is small enough) even soft landed upon the Moon. Cosmic ray flux naturally present in interstellar space is used to power nuclear micro-fusion events (via particle-target micro-fusion and muon-catalyzed micro-fusion) that will propel spacecraft to the asteroids, propel those asteroids with mining potential closer to Earth, as well as generate electrical energy for the mining activity.

Figure 1:
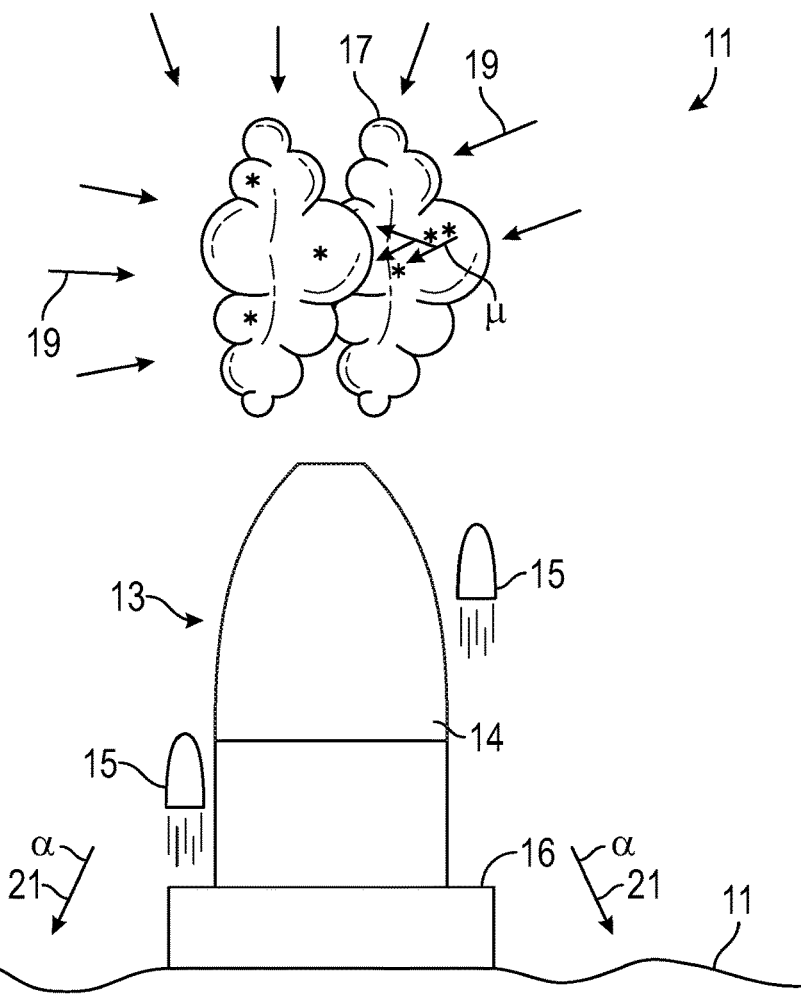
FIG. 1 is a side plan view of a thrust engine attached to an asteroid surface showing deployment of micro-fusion fuel via projectiles.

With reference to FIG. 1, one propulsion technique to propel an asteroid upon a desired trajectory, is to project the micro-fusion target material in a specified direction outward from the asteroid surface 11, i.e. toward the rear of its intended trajectory from a set of gun-like engines 13 attached at various points onto the asteroid 11. The engines 13 have a supply vault 14 for the projectiles 15 and a gun 16 for firing them outward. For example, one may shoot "fuel" packages (chips, pellets, powder) loaded in a series of projectiles 15, at a specified rate (e.g. once per second), which can then disperse the micro-fusion material as a localized cloud 17, much like artillery from an antiaircraft gun or the shooting of fireworks.

The space propulsion system works in the presence of an ambient flux 19 of cosmic rays and/or muons which interact with the cloud 17 and trigger the nuclear micro-fusion of the particle target material, either by particle-target micro-fusion or muon-catalyzed micro-fusion or both. The micro-fusion fuel releases as a cloud 17 from the projectiles 15 can be solid $Li^6D$ in powder form, D-D or D-T inertial-confinement-fusion-type pellets, $D_2O$ ice crystals, or droplets of (initially liquid) $D_2$. Fusion products 21 having significant kinetic energy (e.g. alpha particles) are generated and are received upon the asteroid surface 11 to produce thrust against the asteroid. The thrust results in acceleration (or deceleration) of the asteroid along a specified trajectory.

Stored fuel packages 15 associated with the attached "engine" 13 will be shielded, at least within the casing of the projectiles themselves, to reduce or eliminate premature fusion events until delivered and dispersed as a cloud adjacent to the asteroid. Some small amount of metal for the engine 13 could be used for shielding, if needed. (For example, the Juno spacecraft to Jupiter contains radiation vaults of 1 cm thick titanium to shield its electronics from external radiation. A similar type of vault 14 might be used in this case for the shielding of the stored fuel.) Alternatively, another possible source of such shielding might include the astronaut-miners' own water supply (if part of a manned mission), which should be adequate for the task. One need not eliminate cosmic rays or their secondary particles (pions, muons, etc.) to zero, but merely reduce their numbers and energies sufficiently to keep them from catalyzing sufficiently large numbers of fusion events in the stored target particle material. After being shot from the gun 16, the casing of the projectiles 15 themselves will continue to provide some shielding until dispersal of the target particle material as a cloud 17.

Figure 2:
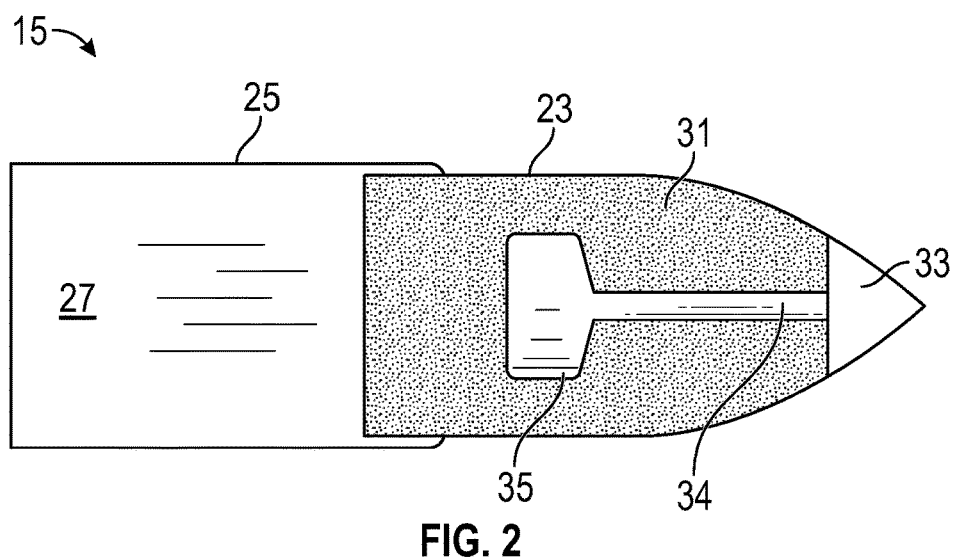
FIG. 2 is schematic sectional view of one possible projectile package or shell for containing and dispersing the micro-fusion fuel material.

A variety of known pyrotechnic or artillery shell structures might be employed, the difference being in the content of the material to be dispersed. As seen in FIG. 2, one possible structure comprises a shell 15 having a shell wall 23 containing the micro-fusion fuel material 31 and attached at the back to a cartridge case 25 with solid-chemical-fuel propellant 27 for launching the shell to a targeted location. Within the shell wall 23, for example at or near its tip is a fuse 33 for triggering the release and dispersal of the material 31, e.g. by explosive means including a central ignition tube 34 leading to a shell-bursting charge 35. The fuse 33 can be based upon timing, barometric pressure, a determined position, or other known mechanisms to ensure that dispersal of the fuel material 31 occurs at an optimal altitude over the targeted location.

Soon after the projectile has reached a desired distance from the asteroid the fuel package releases its particle target material. For example, a chemical explosion can be used to locally disperse the micro-fusion material. The shells or other form of package should disperse the micro-fusion fuel elements at a desired "altitude" (i.e. distance from the asteroid surface) for optimal dispersal of the fuel material relative to the asteroid. Various mechanisms for triggering a chemical explosion of the package could be employed. Triggering technologies can include any one or more of (1) a timer, (2) a location detector, or (3) laser or microwave beam(s) directed at the package from one or more surface bases or nearby spacecraft. Optimal distance for dispersing the material may depend upon asteroid size and composition.

The dispersed cloud of target material will be exposed to both cosmic rays and to their generated muons. To assist in the formation of muons for muon-catalyzed fusion, especially when $D_2O$ or $D_2$ is used, the target package may contain up to 20% by weight of added particles of fine sand or dust. As cosmic rays collide with both micro-fusion target material and dust, they form muons that are captured by the deuterium and that catalyze micro-fusion. Likewise, the cosmic ray collisions themselves can directly trigger particle-target micro-fusion.

Besides D-D micro-fusion reactions, other types of micro-fusion reactions may also occur (e.g. D-T, using tritium generated by cosmic rays impacting the lithium-6; as well as $Li^6$-D reactions from direct cosmic ray collisions). For this latter reaction, it should be noted that naturally occurring lithium can have an isotopic composition ranging anywhere from as little as 1.899% to about 7.794% $Li^6$, with most samples falling around 7.4% to 7.6% $Li^6$. Although LiD that has been made from natural lithium sources can be used in lower thrust applications or to inhibit a runaway macro-fusion event, fuel material that has been enriched with greater proportions of $Li^6$ is preferable for achieving greater thrust and efficiency.

The micro-fusion reactions in the dispersed cloud creates a kind of "external" combustion engine that will provide thrust against one side of the asteroid. The asteroid effectively acts as the equivalent of a piston in an external combustion engine and the volume of the continuous slow micro-fusion creates high velocity fusion products (alpha particles, etc.) that bombard the asteroid surface. Even the photon radiation generated by micro-fusion events supplies pressure to help accelerate the asteroid. The required rate of firing will depend on the amount of acceleration required, the amount of fusion obtained from the ambient cosmic ray and/or muon flux, the dispersal rate of the fuel cloud from in front of the asteroid, and the efficiency of the transfer of the fusion products into thrust, but could be expected to be as much as one shell per second for the duration of the thrusting period. The amount of energy generated depends upon the quantity of fuel released and the quantity of available cosmic rays and muons. Assuming most of the energy can be captured and made available for thrust, an estimated $10^{15}$ individual micro-fusion reactions (less than 1 μg of fuel consumed) per second would be required for 1 kW output. But as each cosmic ray can create hundreds of muons and each muon can catalyze 100 micro-fusion reactions, the available cosmic ray flux in interplanetary space is believed to be sufficient for this asteroid thrusting purpose following research, development, and engineering efforts.

The number of micro-fusion thrust "engines" needed will depend upon the size (i.e. mass) of the asteroid to be redirected and upon the acceleration required. Additionally, if the asteroid has any amount of rotation relative to its trajectory, the operation of the various engines will need to be coordinated so that only those engines located (at any given point in time) where they can provide the desired thrust direction are active. When the asteroid rotates, some engines will shut off and others turned on, as needed, to maintain the target thrusting in the correct direction.

Figure 3:
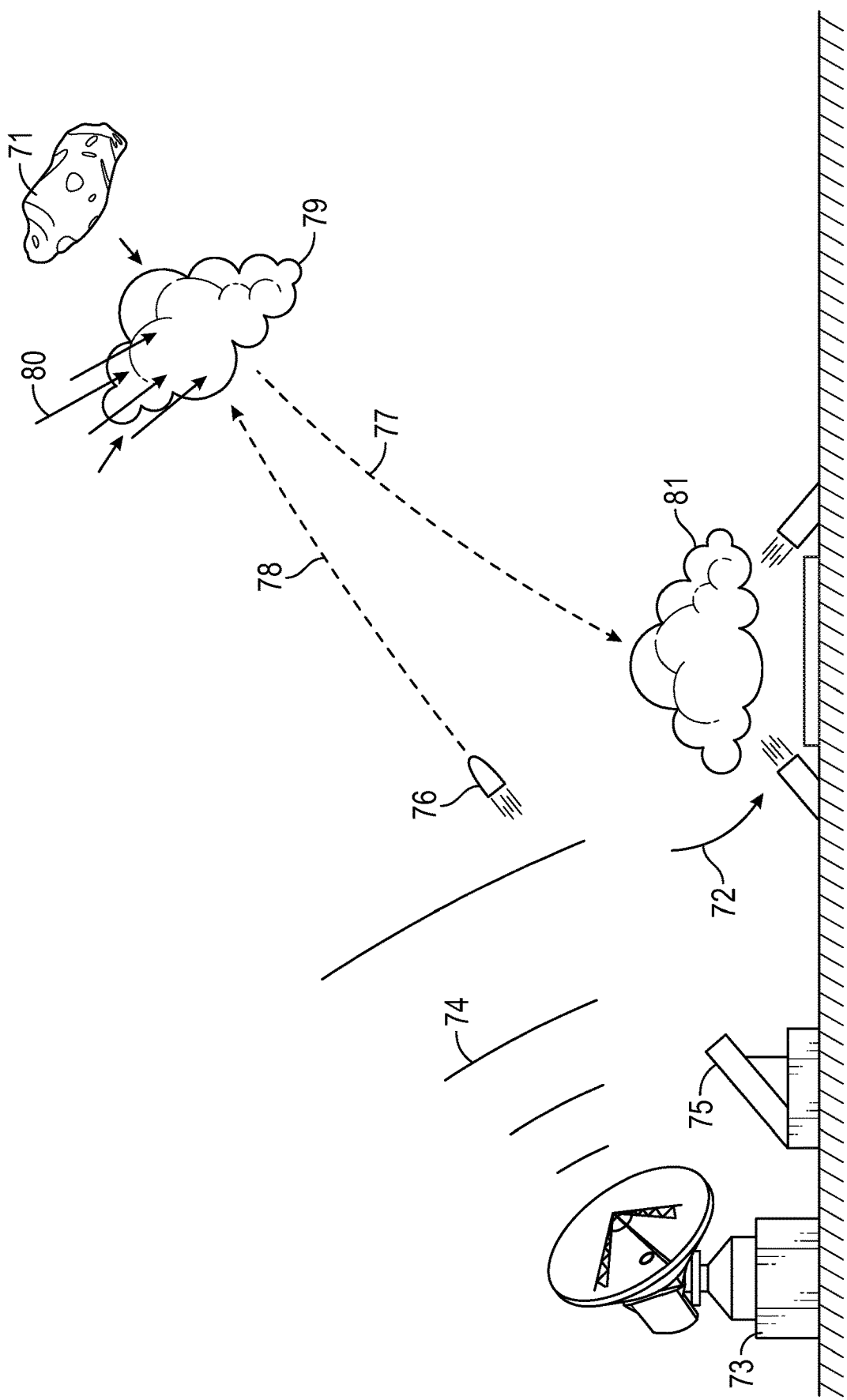
FIG. 3 is schematic side view of an automated soft-landing system based on pre-positioned equipment at a landing site for guiding and facilitating landing of incoming small asteroids.
Figure 4:
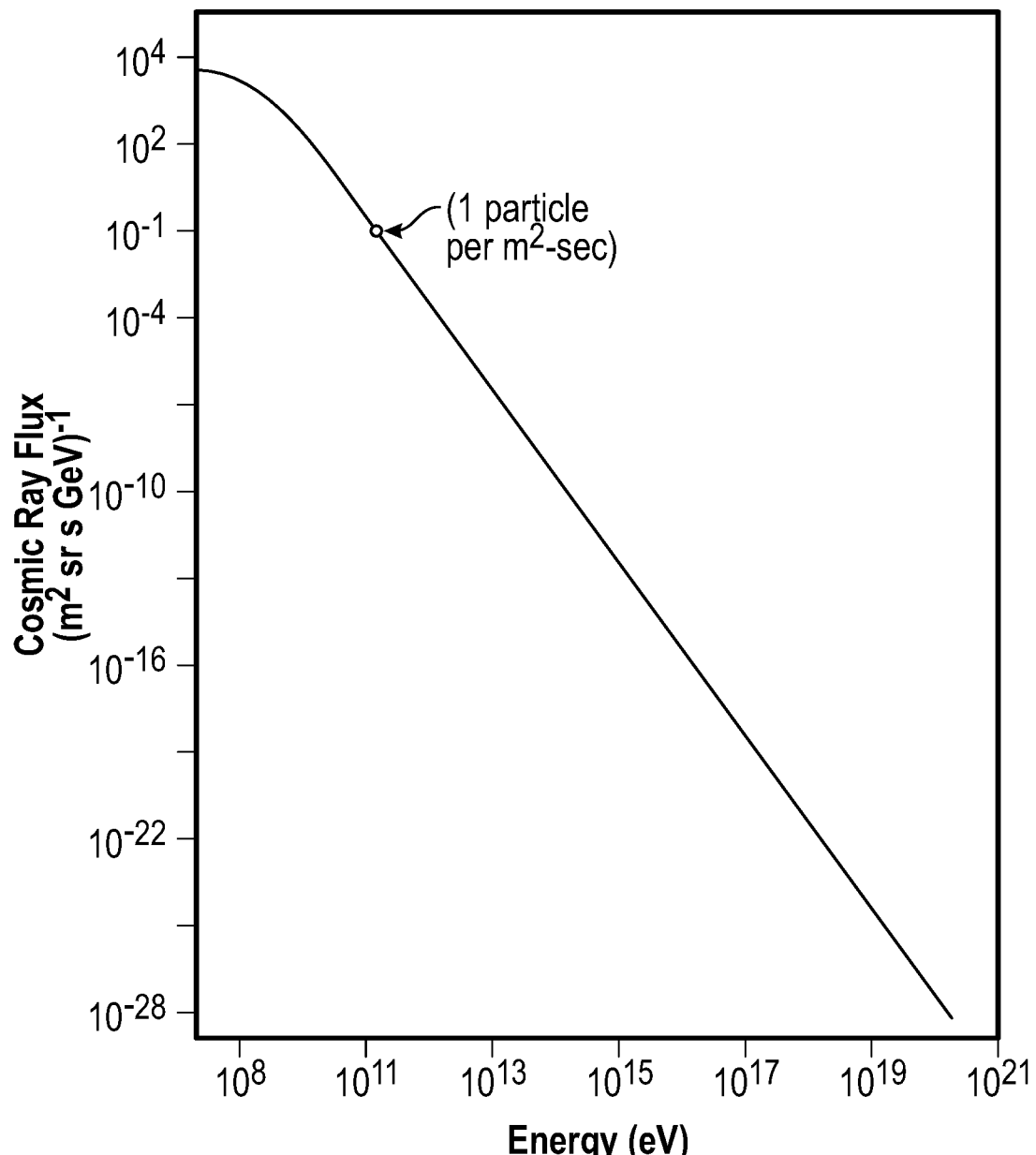
FIG. 4 is a graph of cosmic ray flux at the Earth surface versus cosmic ray energy, after very significant cosmic ray absorption by Earth's atmosphere has occurred.

With reference to FIG. 3, an automated soft-landing system (providing for human intervention only as a backup or for emergencies) can be based upon the micro-fusion for achieving a soft landing of a small asteroid 71 onto a lunar or planetary surface. As seen, the landing system has been pre-positioned at one or more desired landing sites on the surface. The landing system would include a radar subsystem 73 to track the arriving asteroid 71, precisely measuring its altitude, velocity, trajectory, and rate of change of these parameters. Using those measurements, the landing system could then launch a sequence of micro-fusion fuel packages 76 from a gun 75 near the designated landing site 72. The shell projectile packages 76 are delivered along a trajectory 78 to specified locations directly in the asteroid's incoming flight path 77, then the projectile's contents are dispersed as a cloud 79 of micro-fusion target material to interact with incoming cosmic rays 80 and muons to generate energetic fusion products that produce the desired braking thrust upon the asteroid 71 as it approaches the landing site 72.

Each landing site 72 would have a radar system 73 that emits directed radio energy 74 toward the incoming asteroid 71 and receive the reflected radio signal so as to determine altitude, trajectory, velocity, rate of change and other parameters needed to deliver micro-fusion fuel packages 76 to locations that will get the asteroid 71 safely to its landing site 72. The packages 76 and the micro-fusion fuel cloud 79 they release provide the needed retro-thrust or braking cushion to the asteroid 71. Additionally, the immediate landing site 72 may directly release a cloud 81 of the micro-fusion material to create a retro-thrust landing cushion. The software program and its associated radar tracking equipment 73 and the gun (or guns) 75 directing the projectiles 76 together form an automated landing system that can have AI (e.g. self-learning) features, whereby each landing of an asteroid 71 is evaluated according to specified benchmarks, and then adjusted for subsequent landings to deliver more accurately the shell projectiles 76 that create the micro-fusion braking cushions 79 and 81. For example, the system may have the benefit of cosmic ray or muon flux measurements during a landing sequence and need to adjust the rate projectile firing to compensate for any change in these conditions.

Asteroids that would be arriving at the lunar or planetary surface will decelerate in a braking phase in preparation for landing. Landing sites will have been selected and have the automated landing systems set up in advance at each of them. The asteroid's attached thrust engines may receive telemetry data from the landing systems of one or more landing sites so that its own flight parameters can be confirmed before beginning a landing sequence. Once a landing site is selected (and preferably a suitable back-up landing site as well), the asteroid would use its own propulsion system to set up its initial trajectory for the landing. This could include, for example, an onboard ion propulsion system to steer the asteroid as needed. At the proper time, the two landing sites would turn on their micro-fusion landing cushions and confirm that they are working. Such a landing system could be employed for soft landing of small asteroids (up to 4 meters diameter and 100 metric tons mass) on the Moon, Mars, and the moons or Mars for subsequent asteroid mining. Initially only landing of very small asteroids (starting at about 10 metric tons) would be attempted, but as micro-fusion landing cushion technology and operational experience improves, it might eventually become possible to soft land somewhat larger asteroids (e.g., as much as 10 meters diameter and 1000 metric tons mass).

What is claimed is:

1. A method, operable in the presence of an ambient flux of cosmic rays, of braking an asteroid upon approach to a lunar or planetary surface, comprising:
projecting deuterium-containing particle fuel material in a specified direction outward from a landing site on a lunar or planetary surface toward an approaching asteroid, the asteroid having a mass of not more than 100 metric tons, the asteroid also provided with its own onboard propulsion system,
dispersing the material as a cloud directly in an incoming flight path of the asteroid, the material interacting with the ambient flux of cosmic rays to generate products having kinetic energy; and
receiving by the asteroid of at least some portion of the generated kinetic-energy-containing products to produce thrust directed generally away from the lunar or planetary surface that decelerates the asteroid as it approaches the landing site at a specified trajectory.

2. The method as in claim 1, wherein the deuterium-containing particle fuel material is projected from a pre-positioned system at the landing site to a specified location outward from the asteroid such that the generated kinetic-energy-containing products pushing against the asteroid produce braking thrust according to a desired asteroid trajectory toward the landing site.

3. The method as in claim 2, wherein the pre-positioned landing site further includes radar tracking equipment for determining position, velocity, and trajectory of the asteroid as it approaches the landing site and directs the projecting of the fuel material to a calculated location in relation to the approaching asteroid.

4. The method as in claim 2, wherein the pre-positioned system also disperses a cloud of the deuterium-containing particle fuel material in the immediate vicinity of the landing site such that generated kinetic-energy-containing products create a braking cushion at the landing site.

5. The propulsion system as in claim 1, wherein the deuterium-containing particle fuel material comprises Li⁶D.

6. The propulsion system as in claim 1, wherein the deuterium-containing particle fuel material comprises $D_2O$.

7. The propulsion system as in claim 1, wherein the deuterium-containing particle fuel material comprises $D_2$.

8. The propulsion system as in claim 1, wherein the deuterium-containing particle fuel material is in solid powder form.

9. The propulsion system as in claim 1, wherein the deuterium-containing particle fuel material is in pellet form.

10. The propulsion system as in claim 1, wherein the deuterium-containing particle fuel material is in frozen form.

11. The propulsion system as in claim 1, wherein the deuterium-containing particle fuel material is in liquid droplet form.

12. The propulsion system as in claim 1, wherein the deuterium-containing particle fuel material also contain up to 20% by weight of added particles of fine sand or dust.

13. The propulsion system as in claim 1, wherein the deuterium-containing particle fuel material is projected outward from the landing site as successive packages.

14. The propulsion system as in claim 13, wherein each package is configured to disperse the deuterium-containing particle fuel material as localized cloud at a specified distance from the asteroid.

15. The propulsion system as in claim 1, wherein each landing site has at least one gun and a set of shell projectiles to be shot from the at least one gun to target areas for fuel material dispersal.

16. The propulsion system as in claim 15, wherein the shell projectiles contain a chemical explosive and a fuse configured to disperse the fuel material as a localized cloud at a specified distance from the asteroid.

17. The propulsion system as in claim 15 wherein each shell projectile comprises a shell wall encasing the fuel material with a fuse and chemical explosive charge activated by the fuse.

18. The propulsion system as in claim 17, wherein the shell projectile further comprises a cartridge case containing a propellant for projecting the shell to a targeted location.

19. The propulsion system as in claim 17, wherein the fuse comprises a timer for activating the explosive charge at a specified time after projection of the shell.

20. The propulsion system as in claim 17 wherein the fuse comprises a location detection system for activating the explosive charge when the shell reaches a targeted location.

* * * * *